US011301134B2

(12) United States Patent
Hatsutori et al.

(10) Patent No.: US 11,301,134 B2
(45) Date of Patent: Apr. 12, 2022

(54) USING ATTACK TREES TO REDUCE MEMORY CONSUMPTION BY RULE ENGINES

(71) Applicant: INTERNATIONAL BUSINESS MACHINES CORPORATION, Armonk, NY (US)

(72) Inventors: Yoichi Hatsutori, Tokyo (JP); Takuya Mishina, Kanagawa (JP); Naoto Sato, Kanagawa-ken (JP); Fumiko Satoh, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 983 days.

(21) Appl. No.: 15/794,932

(22) Filed: Oct. 26, 2017

(65) Prior Publication Data

US 2019/0129620 A1     May 2, 2019

(51) Int. Cl.
| | |
|---|---|
| *G06F 21/00* | (2013.01) |
| *G06F 3/06* | (2006.01) |
| *G06F 21/55* | (2013.01) |
| *G06F 16/22* | (2019.01) |
| *G06F 21/60* | (2013.01) |

(52) U.S. Cl.
CPC .......... *G06F 3/0608* (2013.01); *G06F 3/0604* (2013.01); *G06F 3/067* (2013.01);
(Continued)

(58) Field of Classification Search
CPC ................... H04L 63/20; H04L 63/205; H04L 63/14–1491; H04L 63/1441;
(Continued)

(56) References Cited

U.S. PATENT DOCUMENTS

| | | | |
|---|---|---|---|
| 5,805,878 A | * 9/1998 | Rahman | ................ G06F 9/3806 712/239 |
| 9,369,484 B1 | * 6/2016 | Lacerte | ............... H04L 63/1416 |

(Continued)

FOREIGN PATENT DOCUMENTS

CN     106131078 A   * 11/2016

OTHER PUBLICATIONS

DSP56300 Family Manual, 24-Bit Digital Signal Processors, Rev. 5, Apr. 2005, Freescale Semiconductor, Inc. (2005) (Year: 2005).*

(Continued)

*Primary Examiner* — Joseph P Hirl
*Assistant Examiner* — Ka Shan Choy
(74) *Attorney, Agent, or Firm* — Tutunjian & Bitetto, P.C.; Randall Bluestone

(57) ABSTRACT

A method is provided for reducing memory consumption by a rule engine. The method includes receiving attack trees, each having nodes and edges. Each node represents a security event and is associated with a detection rule for detecting an occurrence thereof. Each edge connects a respective node pair. The method includes assigning a watchpoint to each leaf node. The method includes moving the watchpoint assigned to any leaf node to a next upstream node, responsive to detecting an occurrence of the security event represented by the leaf node. The method includes erasing the watchpoint assigned to all downstream nodes relative to the next upstream node, responsive to the next upstream node being connected to a next downstream node using an edge having an "OR" join type. Only the rules for nodes currently having the watchpoint assigned are loaded into a memory device during runtime, while excluding rules for remaining nodes.

20 Claims, 10 Drawing Sheets

| time | event (transition) | target device # | number of rules | set of rules |
|---|---|---|---|---|
| 0 | - | - | 4 | ACEK |
| 1 | A -> B | 1 | 5 | ABCEK |
| 2 | E -> F | 2 | 6 | ABCEFK |
| 3 | K -> J | 1 | 7 | ABCEFJK |
| 4 | E -> F | 1 | 6 | ABCFJK |
| 5 | F -> G | 1 | 7 | ABCFGJK |
| 6 | B -> D | 1 | 7 | ADCFGJK |

(52) U.S. Cl.
CPC .......... *G06F 3/0631* (2013.01); *G06F 3/0673* (2013.01); *G06F 16/2246* (2019.01); *G06F 21/554* (2013.01); *G06F 21/604* (2013.01); *G06F 2221/034* (2013.01); *G06F 2221/2141* (2013.01)

(58) Field of Classification Search
CPC ............... H04L 63/1416; G06F 21/577; G06F 2221/034; G06F 21/552; G06F 21/57; G06F 21/554; G06F 21/55; G06F 21/566; G06F 3/0608; G06F 21/604; G06F 16/2246; G06F 3/0604; G06F 3/0631; G06F 3/0673; G06F 3/067; G06F 2221/2141
See application file for complete search history.

(56) References Cited

U.S. PATENT DOCUMENTS

| | | | | |
|---|---|---|---|---|
| 10,243,990 | B1* | 3/2019 | Chen | G06F 21/71 |
| 10,332,384 | B1* | 6/2019 | Schryer | G06N 5/025 |
| 2005/0192921 | A1* | 9/2005 | Chaudhuri | G06F 16/2358 |
| 2014/0122378 | A1 | 5/2014 | Swaminathan et al. | |
| 2015/0286932 | A1 | 10/2015 | Jackson et al. | |
| 2017/0126741 | A1 | 5/2017 | Lang et al. | |
| 2017/0171230 | A1 | 6/2017 | Leiderfarb et al. | |
| 2017/0324759 | A1* | 11/2017 | Puri | H04L 41/0631 |
| 2018/0083893 | A1* | 3/2018 | Viswanathan | G06F 16/951 |
| 2018/0006961 | A1* | 8/2018 | Guibene | H04L 47/70 |

OTHER PUBLICATIONS

Smith, Alan Jay, "Cache Memories", Computing Surveys, vol. 14, No. 3, final revision accepted Jan. 1982 (Year: 1982).*

Salvaneschi, et al., "Engineering Models and Software Quality Models: An Example and a Discussion", MiSE'08, May 2008, pp. 39-44.

Wang et al., "Augmented Attack Tree Modeling of Distributed Denial of Services and Tree Based Attack Detection Method", 2010 10th IEEE International Conference on Computer and Information Technology (CIT 2010), Jul. 2010, pp. 1009-1014.

* cited by examiner

USING ATTACK TREES TO REDUCE MEMORY CONSUMPTION BY RULE ENGINES

BACKGROUND

Technical Field

The present invention relates generally to information processing and, in particular, to using attack trees to reduce memory consumption by rule engines.

Description of the Related Art

The number and types of attacks against Internet of Things (IoT) devices is increasing. Due to Internet connectivity limitations of IoT devices, attack detection should be preferably done on a small box (e.g., a slim device) adjacent to the IoT devices.

However, traditional attack detection is done on a workstation or a server equipped with a memory having a typical size on the order of gigabytes, where the rule engines used for attack detection can consume much of that memory, thus being essentially unsuitable for any practical IoT attack detection.

Hence, there is a need for an approach for reducing memory consumption of such rule engines/algorithms for attack detection.

SUMMARY

According to an aspect of the present invention, a computer-implemented method is provided for reducing memory consumption by a rule engine. The method includes receiving a set of attack trees. Each of the attack trees have nodes and edges. Each of the nodes represents a respective security event and is associated with a respective detection rule for detecting an occurrence of the respective security event. Each of the edges connect a respective pair of the nodes. The method further includes assigning a respective watchpoint to each of leaf nodes from among the nodes in the attack trees. The method also includes moving the respective watchpoint assigned to any given one of the leaf nodes to a next upstream node, responsive to detecting an occurrence of the respective security event represented by the given one of the leaf nodes. The method additionally includes erasing the respective watchpoint assigned to all downstream nodes relative to the next upstream node, responsive to the next upstream node being connected to a next one of the downstream nodes using an edge having an "OR" join type. Only the respective detection rule for the nodes currently having the respective watchpoint assigned thereto are loaded into a memory device during runtime, while excluding from the memory device the respective detection rule for remaining ones of the nodes in the attack trees to reduce the memory consumption.

According to another aspect of the present invention, a computer program product is provided for reducing memory consumption by a rule engine. The computer program product includes a non-transitory computer readable storage medium having program instructions embodied therewith. The program instructions are executable by a computer to cause the computer to perform a method. The method includes receiving a set of attack trees. Each of the attack trees have nodes and edges. Each of the nodes represents a respective security event and is associated with a respective detection rule for detecting an occurrence of the respective security event. Each of the edges connect a respective pair of the nodes. The method further includes assigning a respective watchpoint to each of leaf nodes from among the nodes in the attack trees. The method also includes moving the respective watchpoint assigned to any given one of the leaf nodes to a next upstream node, responsive to detecting an occurrence of the respective security event represented by the given one of the leaf nodes. The method additionally includes erasing the respective watchpoint assigned to all downstream nodes relative to the next upstream node, responsive to the next upstream node being connected to a next one of the downstream nodes using an edge having an "OR" join type. Only the respective detection rule for the nodes currently having the respective watchpoint assigned thereto are loaded into a memory device during runtime, while excluding from the memory device the respective detection rule for remaining ones of the nodes in the attack trees to reduce the memory consumption.

According to yet another aspect of the present invention, a computer processing system is provided for reducing memory consumption by a rule engine. The computer processing system includes a memory device. The computer processing system further includes a processor operatively coupled to the memory device. The processor is configured to receive a set of attack trees. Each of the attack trees have nodes and edges. Each of the nodes represents a respective security event and is associated with a respective detection rule for detecting an occurrence of the respective security event. Each of the edges connect a respective pair of the nodes. The processor is further configured to assign a respective watchpoint to each of leaf nodes from among the nodes in the attack trees. The processor is also configured to move the respective watchpoint assigned to any given one of the leaf nodes to a next upstream node, responsive to detecting an occurrence of the respective security event represented by the given one of the leaf nodes. The processor is additionally configured to erase the respective watchpoint assigned to all downstream nodes relative to the next upstream node, responsive to the next upstream node being connected to a next one of the downstream nodes using an edge having an "OR" join type. Only the respective detection rule for the nodes currently having the respective watchpoint assigned thereto are loaded into the memory device during runtime, while excluding from the memory device the respective detection rule for remaining ones of the nodes in the attack trees to reduce the memory consumption.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to reducing the memory consumption of rule engines using an attack tree.

Attack trees provide a formal, methodical way of describing the security of a target system based on varying attacks. Basically, attacks against a system are represented in a tree structure, with the goal as the root node and different ways of achieving that goal as leaf nodes.

Hence, attack trees can be represented as multi-leveled diagrams that include one root, leaves, and children. From the bottom up, child nodes are conditions which must be satisfied to make the direct parent node true. When the root is satisfied, the attack is complete. Each node may be satisfied only by its direct child nodes.

As used herein, the term, "bottom up" refers to going a direction in an attack tree commencing at a leaf node(s) and heading towards the root node, and does not have to mean actually arriving at the root node. Moreover, as used herein, the term "upstream" refers to going from a node (e.g., a leaf or internal node) towards the root node, and does not have to mean actually arriving at the root node. Conversely, as used herein, the term "downstream" refers to going from the root node or an internal node(s) towards a leaf node(s).

In accordance with one or more embodiments of the present invention, an attack tree can be used to exclude certain detection rules from a memory, thus reducing memory consumption and improving the overall functioning of the computer in which the memory is included. These and other advantages of the present invention are readily determined by one of ordinary skill in the art, given the teachings of the present invention provided herein, while maintaining the spirit of the present invention.

Figure 1:
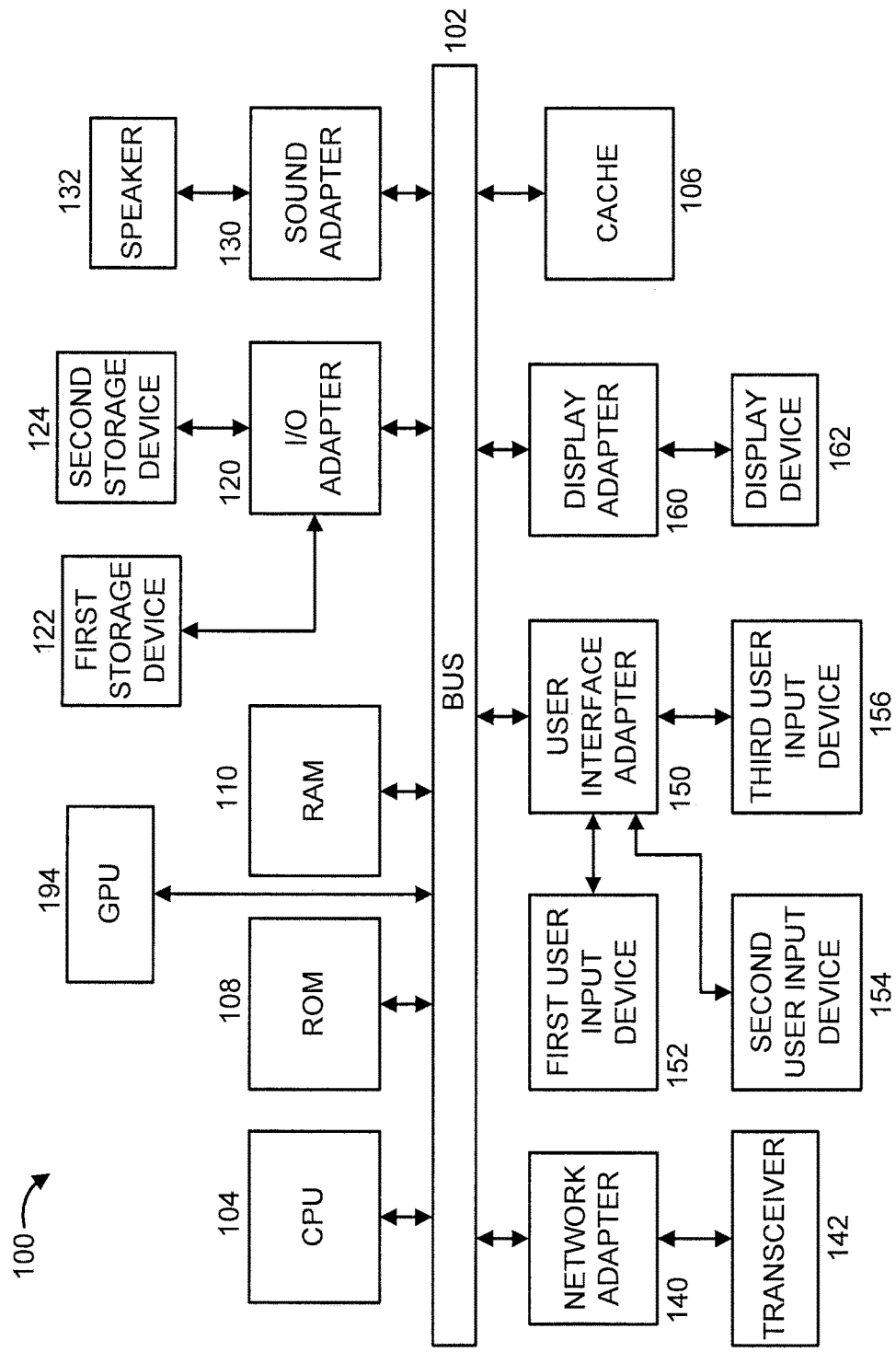
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
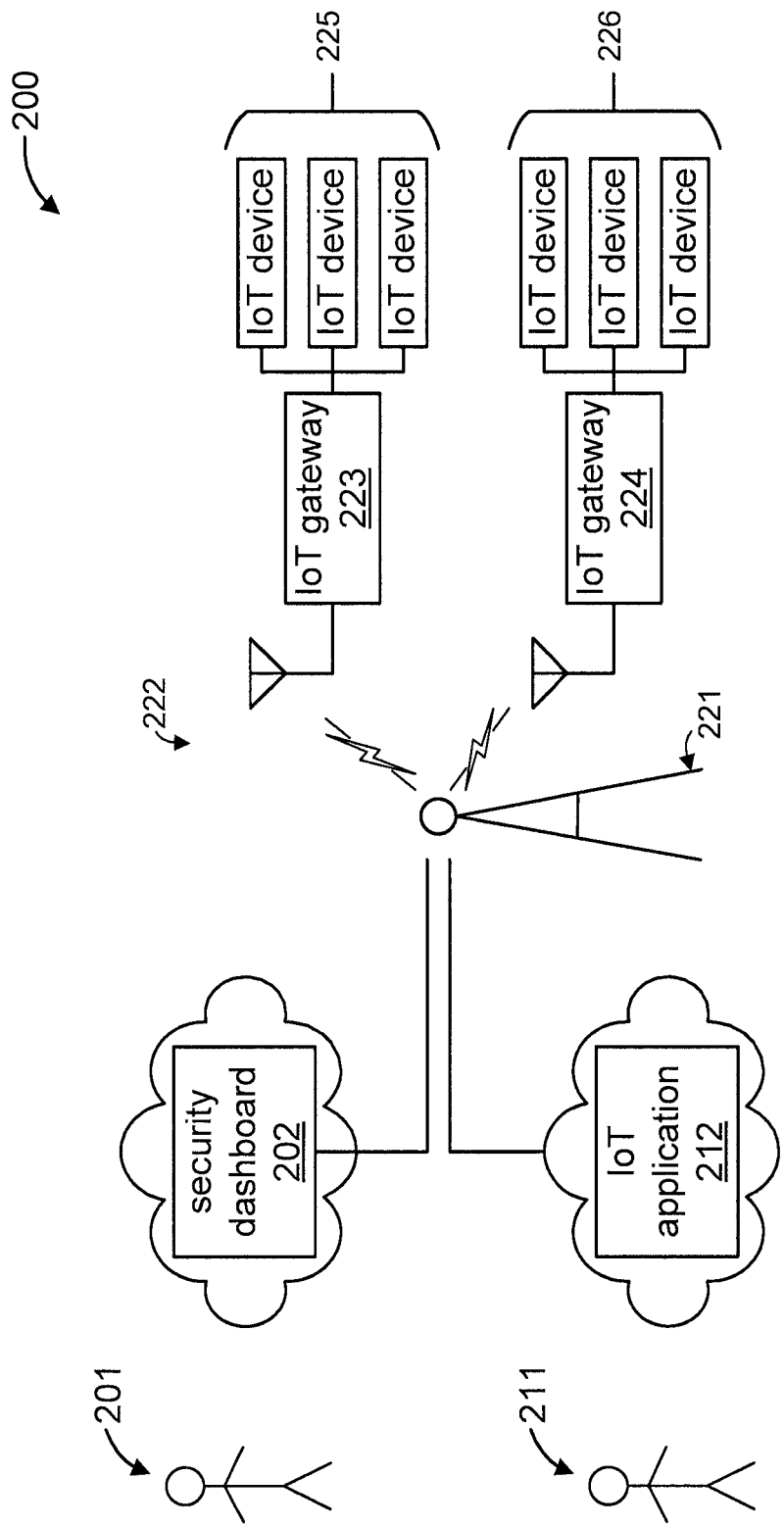
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 4:
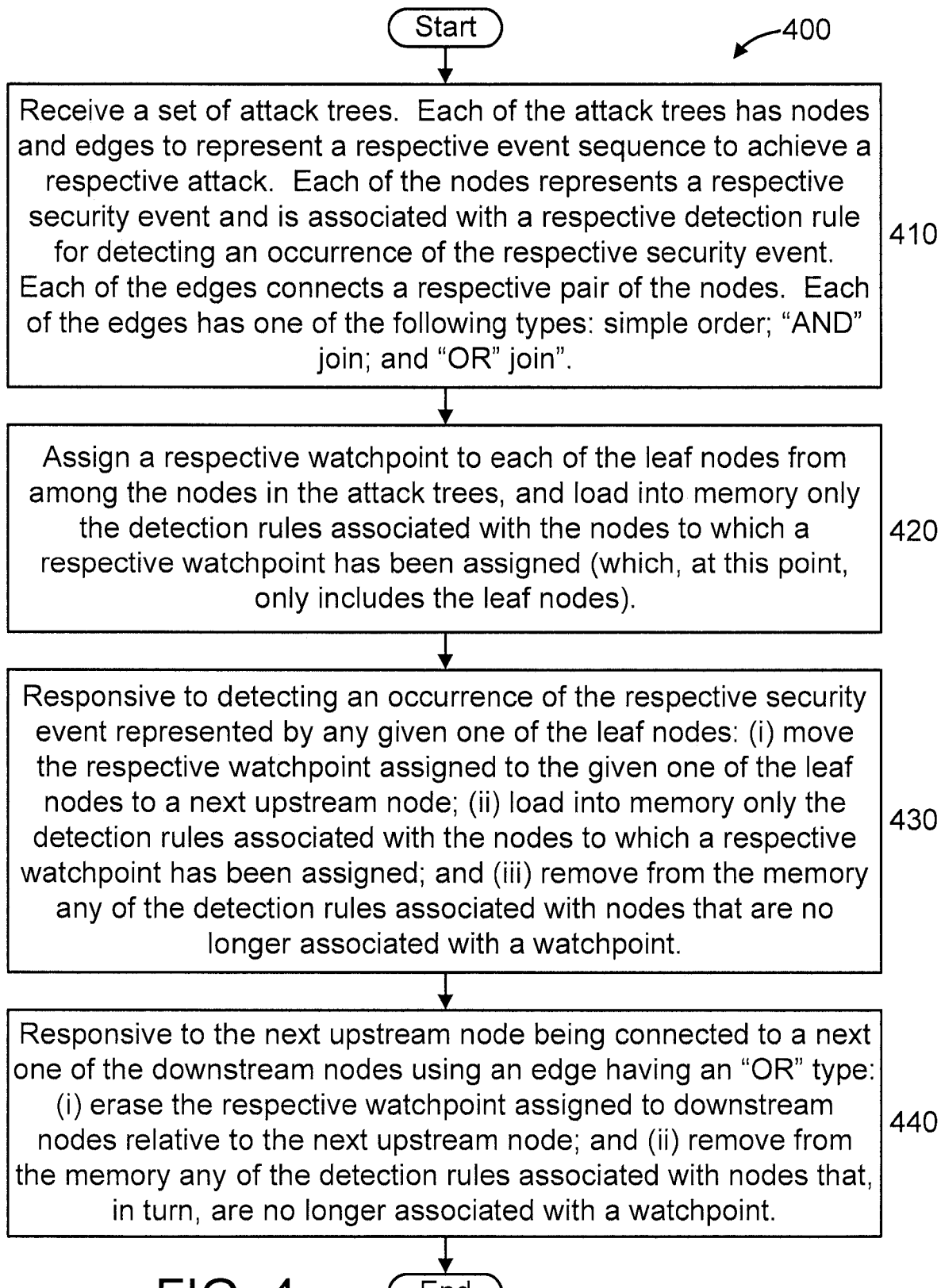
FIG. 4 shows an exemplary method for reducing memory consumption of rule engines using attack trees, in accordance with an embodiment of the present invention.

Further, it is to be appreciated that processing system 100 may perform at least part of the method described herein including, for example, at least part of method 400 of FIG. 4. Similarly, part or all of environment 200 may be used to perform at least part of method 400 of FIG. 4.

Hereinafter, an exemplary environment to which the present invention can be applied is described with respect to FIG. 2. The environment is described with respect to, e.g., one or more Internet of Things (IoT) devices for the sake of illustration. However, as readily appreciated by one of ordinary skill in the art, the present invention can be applied to IoT and other types of computing devices. Similarly, while the present invention can be described with respect to certain protocols such as Hypertext Transfer Protocol (HTTP) for the sake of illustration, the present invention is not limited to such protocols and can be applied to other protocols. These and other variations of the present invention, its operating environment, and involved protocols are ready determined by one of ordinary skill in the art, given the teachings of the present invention provided herein, while maintaining the spirit of the present invention.

FIG. 2 shows an exemplary environment 200 to which the present invention can be applied, in accordance with an embodiment of the present invention.

The environment 200 involves a security operator 201, a cloud-based security dashboard 202, an application user 211, a cloud-based IoT application 212, a base station 221, a mobile network 222, an IoT gateway 223, an IoT gateway 224, a set of IoT devices 225, and a set of IoT devices 226.

The security operator 201 interfaces with the cloud-based security dashboard 202, which is operatively coupled to the sets of IoT devices 225 and 226 through the base station 221, the mobile network 222, and the IoT gateways 223 and 224. The base station 221 is part of a mobile network 222. The cloud-based security dashboard 202 provides additional security monitoring for the system 200.

The application user 211 interfaces with the cloud-based IoT application 212 to communicate with the sets of IoT devices 225 and 226 through the base station 221, the mobile network 222, and the IoT gateways 223 and 224.

In an embodiment, the IoT devices 225 and 226 are disposed across various locations (two locations in the example shown). The IoT gateways 223 and 224 at each location arrange data from its subsidiary IoT devices 225 and 226, respectively. The IoT devices 225 and 225 include sensors and provide their sensor data to the cloud-based IoT application 212 through the IoT gateways 223 and 224 and mobile network 222.

The sensor data can include security event data. The security event data can include log data and network monitoring data. While such data can often become several megabytes of data per minute, the bandwidth of the mobile network 230 is limited.

Figure 3:
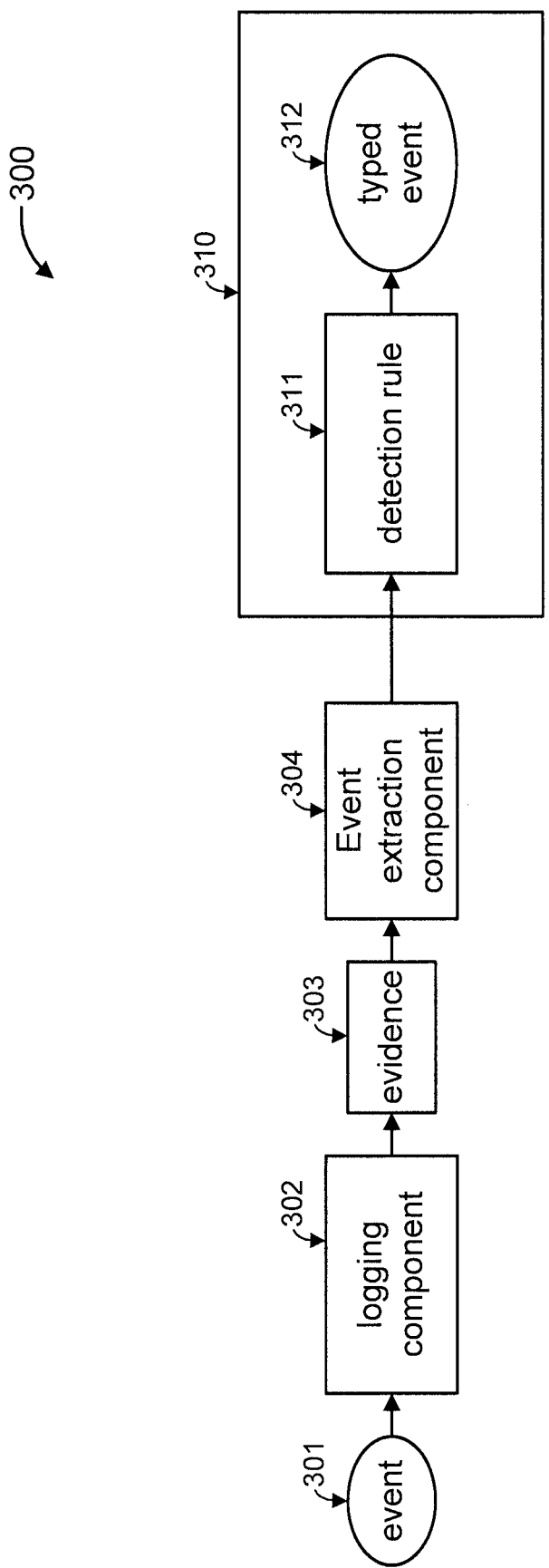
FIG. 3 shows an exemplary event flow to which the present invention can be applied, in accordance with an embodiment of the present invention.

FIG. 3 shows an exemplary event flow 300 to which the present invention can be applied, in accordance with an embodiment of the present invention. The event flow 300 essentially shows basic processes of a rule engine.

The event flow 300 involves an event 301, a logging component 302, a (resultant) evidence 303 (generated by the logging component 302), an event extraction component 304, and a rule engine 310. The rule engine 310 includes a detection rule 311 that can detect the occurrence of a typed event 312.

When some (security) event 301 occurs, the logging component 302 (e.g., syslog of Linux systems, Event Log Service of Microsoft Windows systems, etc.) generates the evidence 303 of the event 301. Then, the event extraction component 304 extracts an event object from the evidence 303. Event objects can include, for example, but are not limited to, log entries, packet data, and so forth. The event object can be extracted by the event extraction component 304 by applying a regular expression(s) to the evidence 303. The rule engine 310 then applies the detection rules 311 to the event object. The rule engine 310 can invoke actions if the state of the rule engine satisfies a condition of any of the detection rules 311.

In an embodiment, at least one of the elements of system 300 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 3 can be implemented in a cloud configuration including, for example, in a distributed configuration. Additionally, one or more elements in FIG. 3 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 300 are readily determined by one of ordinary skill in the art, given the teachings of the present invention provided herein, while maintaining the spirit of the present invention.

FIG. 4 shows an exemplary method 400 for reducing memory consumption of rule engines using attack trees, in accordance with an embodiment of the present invention.

At step 410, receive a set of attack trees. Each of the attack trees has nodes and edges to represent a respective event sequence to achieve a respective attack. Each of the nodes represents a respective security event and is associated with a respective detection rule for detecting an occurrence of the respective security event. Each of the edges connects a respective pair of the nodes. Each of the edges has one of the following types: simple order; "AND" join; and "OR" join". The type "simple order" refers to moving from one node to the next connected node (without consideration of other nodes with to an "AND" or "OR" function). The nodes include leaf nodes and non-leaf nodes (e.g., the root node and internal, non-root nodes).

At step 420, assign a respective watchpoint to each of the leaf nodes from among the nodes in the attack trees, and load into memory only the detection rules associated with the nodes to which a respective watchpoint has been assigned (which, at this point, only includes the leaf nodes).

At step 430, responsive to detecting an occurrence of the respective security event represented by any given one of the leaf nodes: (i) move the respective watchpoint assigned to the given one of the leaf nodes to a next upstream node; (ii) load into memory only the detection rules associated with the nodes to which a respective watchpoint has been assigned; and (iii) remove from the memory any of the detection rules associated with nodes that are no longer associated with a watchpoint.

At step 440, responsive to the next upstream node being connected to a next one of the downstream nodes using an edge having an "OR" type: (i) erase the respective watchpoint assigned to downstream nodes relative to the next upstream node; and (ii) remove from the memory any of the detection rules associated with nodes that, in turn, are no longer associated with a watchpoint.

A further description will now be given regarding aspects of method 400, in accordance with one or more embodiments of the present invention.

For example, method 400 can be applied to various types of rule engines. In an embodiment, method 400 can involve one or more rule engines (e.g., log analysis engines) that process logs to detect certain events. In an embodiment, the one or more rule engines can include one or more Event Condition Action (ECA) rule engines. Of course, the present invention can be applied to other types of rule engines, as readily appreciated by one of ordinary skill in the art, given the teachings of the present invention provided herein, while maintaining the spirit of the present invention. A rule engine can be an algorithm executed by a processing element (e.g., a CPU, a GPU, etc.) or, an Application Specific Integrated Circuit (ASIC), and so forth.

Hence, method 400 is configured such that only the detection rules for attack tree nodes currently having a watchpoint assigned thereto are loaded into a memory device during runtime, while excluding from the memory device the detection rules for remaining ones of the nodes (i.e., those not currently having a watchpoint assigned thereto) in the attack trees to reduce the memory consumption As used herein, "excluding from the memory" can refer to making the space consumed by the excluded rules "free" by either deleting the excluded rules from the memory device, deleting pointers to the excluded rules from the memory device, overwriting the excluded rules in the memory device, overwriting the pointers to the excluded rules in the memory device, and/or so forth, as readily appreciated by one of ordinary skill in the art given the teachings of the present invention provided herein.

Figure 5:
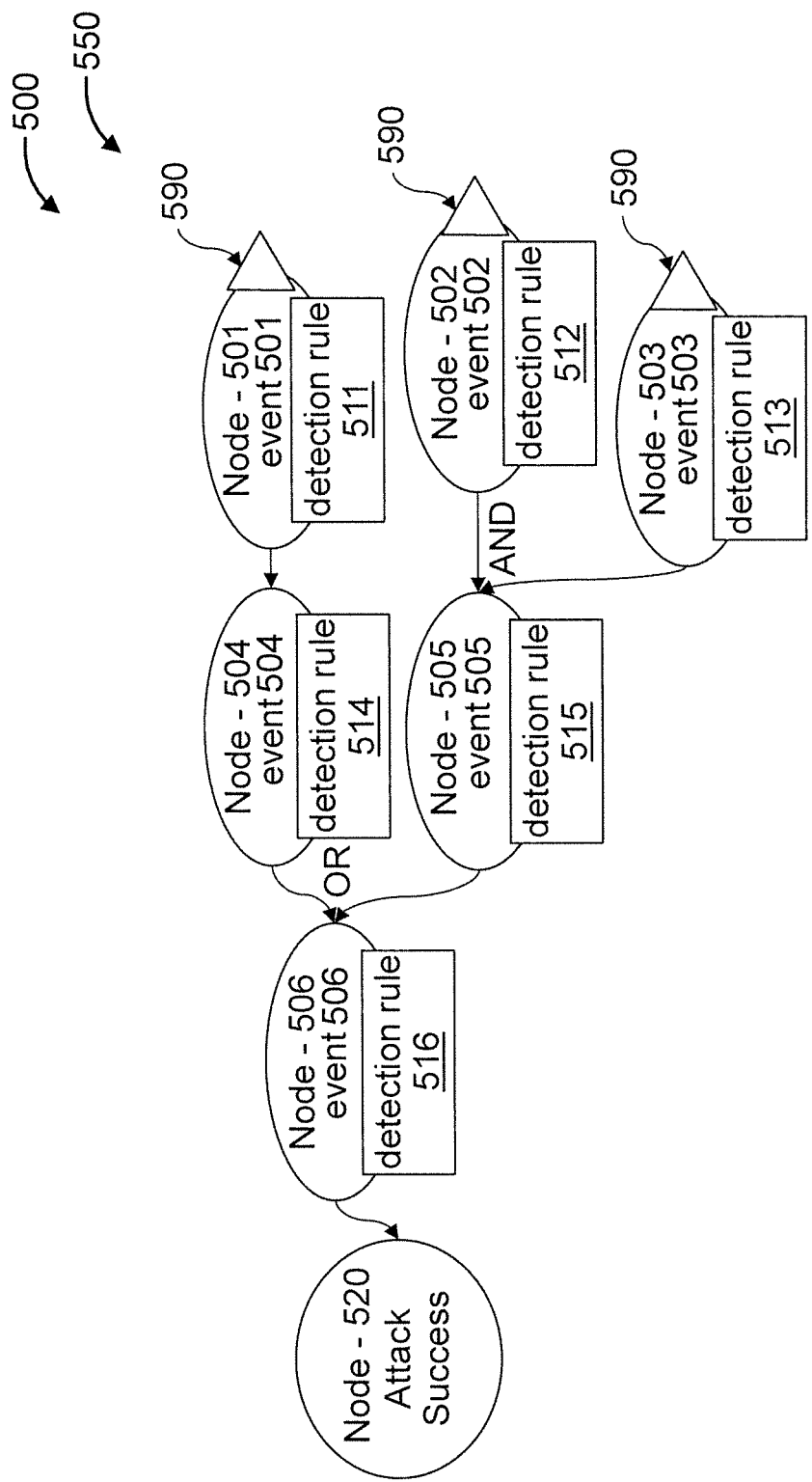
FIG. 5 shows an exemplary application of an attack tree, in accordance with an embodiment of the present invention.

FIG. 5 shows an exemplary application 550 of an attack tree 500, in accordance with an embodiment of the present invention. The exemplary application 550 is presented herein to show the effectiveness of an embodiment of the present invention.

The attack tree 500 includes multiple (non-root) nodes 501 through 506 and root node 520. Nodes 501 through 506 are respectively associated with event 1 through event 6. Nodes 501 through 506 are respectively associated with detection rules 511 through 516. Each of the detection rules 511 through 516 is configured to detect whether the respective event associated therewith has occurred. Root node 520 is associated with attack success. In attack tree 500, the edges for nodes 502 and 503 are of the "AND" type, the edges for nodes 504 and 505 are of the "OR" type, and the remaining edges are of the type "simple order", namely from one node to the next to which it is connected.

The attack tree 500 shows that the goal (attack success) can be achieved by the occurrence of: (1) events 501, 504, and 506; or (2) events 502, 503, 505, and 506.

Referring to attack tree 500, we note the following: (1) We do not need the rule to detect event 504 when we have not yet observed event 501. (2) We do not need the rule to detect event 501 when we have already observed event 501. (3) We do not need the rule to detect event 502, 503, and 505 when we have already observed event 504.

In the exemplary application 550, three (out of six) rules can be excluded from memory at the initial time. That is, the detection rules 514, 515 and 516 corresponding to events 504, 505 and 506 can be excluded from memory at the initial time.

Moreover, in the exemplary application 550, five detection rules can be excluded from memory when the detection stage arrives at the state just before the success of the attack. That is, the detection rules 511 through 515 corresponding to events 501 through 505, can be excluded from memory at the initial time.

The attack tree 500 also includes "watchpoints" 590 (with three watchpoints shown at nodes 501 through 503 respectively corresponding to events 511 through 513). Each watchpoint 590 represents an event for which a rule engine watches. At the initial state, watchpoints 590 are assigned to all of the leaf nodes (e.g., nodes 501 through 503) of the attack tree 500. When an event on a watchpoint is observed, then the watchpoint 590 goes to an upstream-bound node. If the new node for the watchpoint 590 is connected to another downstream-bound node with an "OR" connector, then erase all of the watchpoints 590 under the new node. In the runtime, rules go into and/or go out of the memory of the rule engine when a watchpoint 590 moves node by node. In this way, memory consumption is reduced.

Figure 6:
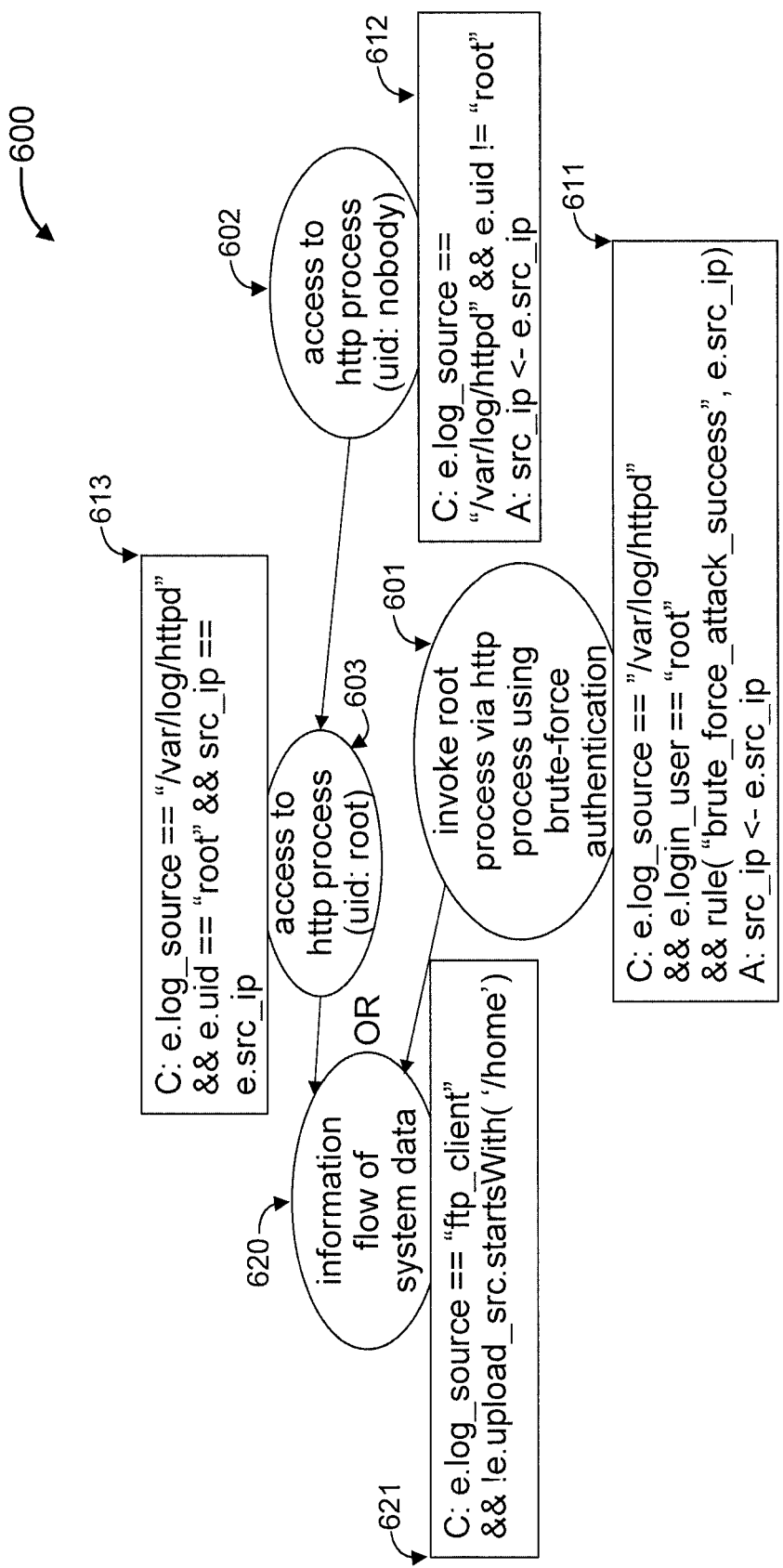
FIG. 6 shows an exemplary attack tree relating to information leakage via a Hypertext Transfer Protocol (HTTP) server vulnerability, in accordance with an embodiment of the present invention.

FIG. 6 shows an exemplary attack tree 600 relating to information leakage via a Hypertext Transfer Protocol (HTTP) server vulnerability, in accordance with an embodiment of the present invention.

The attack tree 600 includes multiple (non-root) nodes 601 through 603 and root node 620. Nodes 601 through 603 are respectively associated with event 601 through event 603. Nodes 601 through 603 are respectively associated with detection rules 611 through 613. Each of the detection rules 611 through 613 is configured to detect whether the respective event associated therewith has occurred. Root node 520 is associated with attack success. In this example, root node 620 is further associated with detection rule 621. Detection rule 621 is configured to detect whether the attack success has been achieved (i.e., whether root node 620 has been reached).

Figure 7:
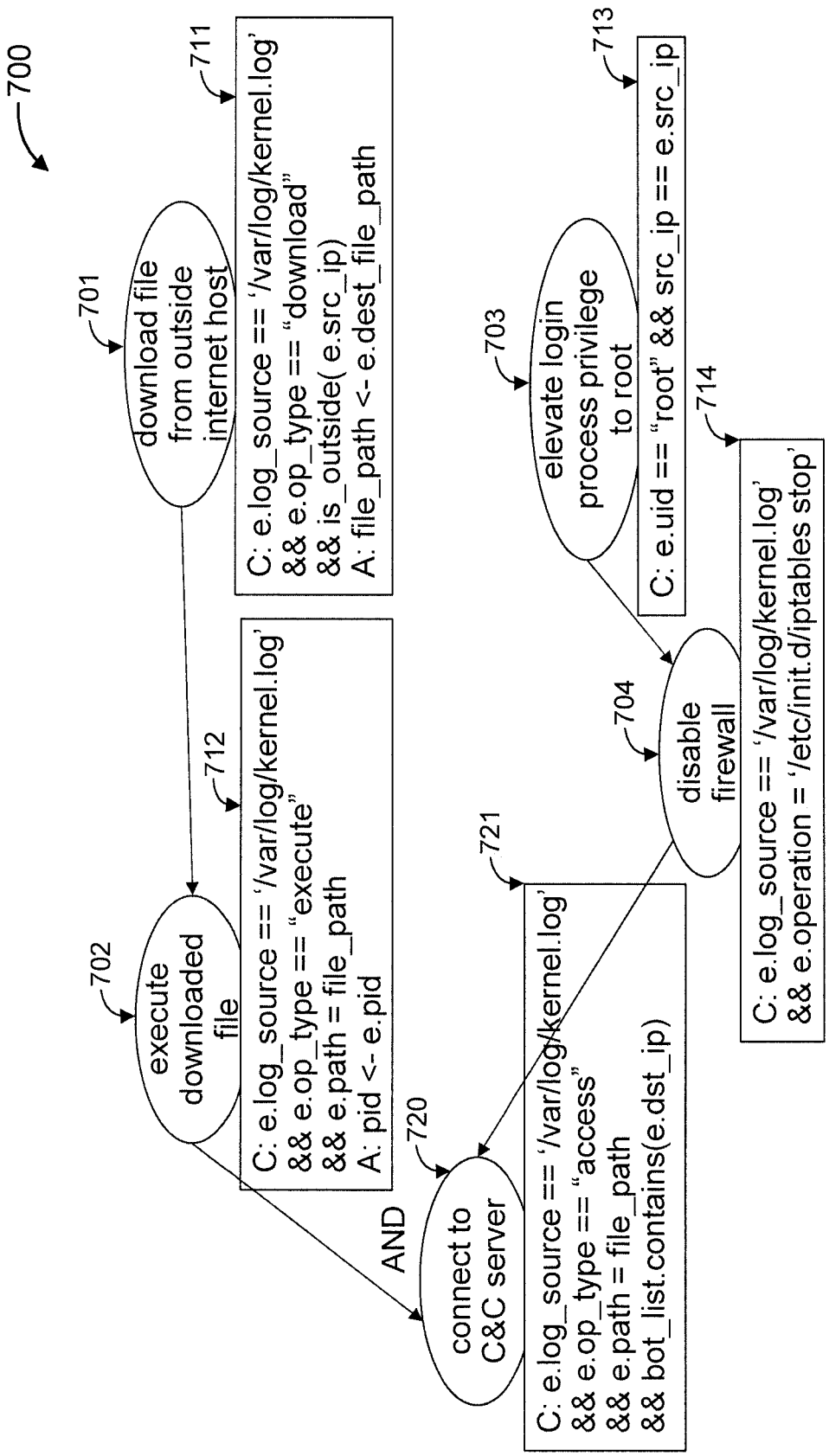
FIG. 7 shows an exemplary attack tree relating to making an Internet of Things device a bot, in accordance with an embodiment of the present invention.

FIG. 7 shows an exemplary attack tree 700 relating to making an Internet of Things device a bot, in accordance with an embodiment of the present invention.

The attack tree 700 includes multiple (non-root) nodes 701 through 704 and root node 720. Nodes 701 through 704 are respectively associated with event 701 through event 704. Nodes 701 through 704 are respectively associated with detection rules 711 through 714. Each of the detection rules 711 through 714 is configured to detect whether the respective event associated therewith has occurred. Root node 720 is associated with attack success. In this example, root node 720 is further associated with detection rule 721. Detection rule 721 is configured to detect whether the attack success has been achieved (i.e., whether root node 720 has been reached).

Figure 8:
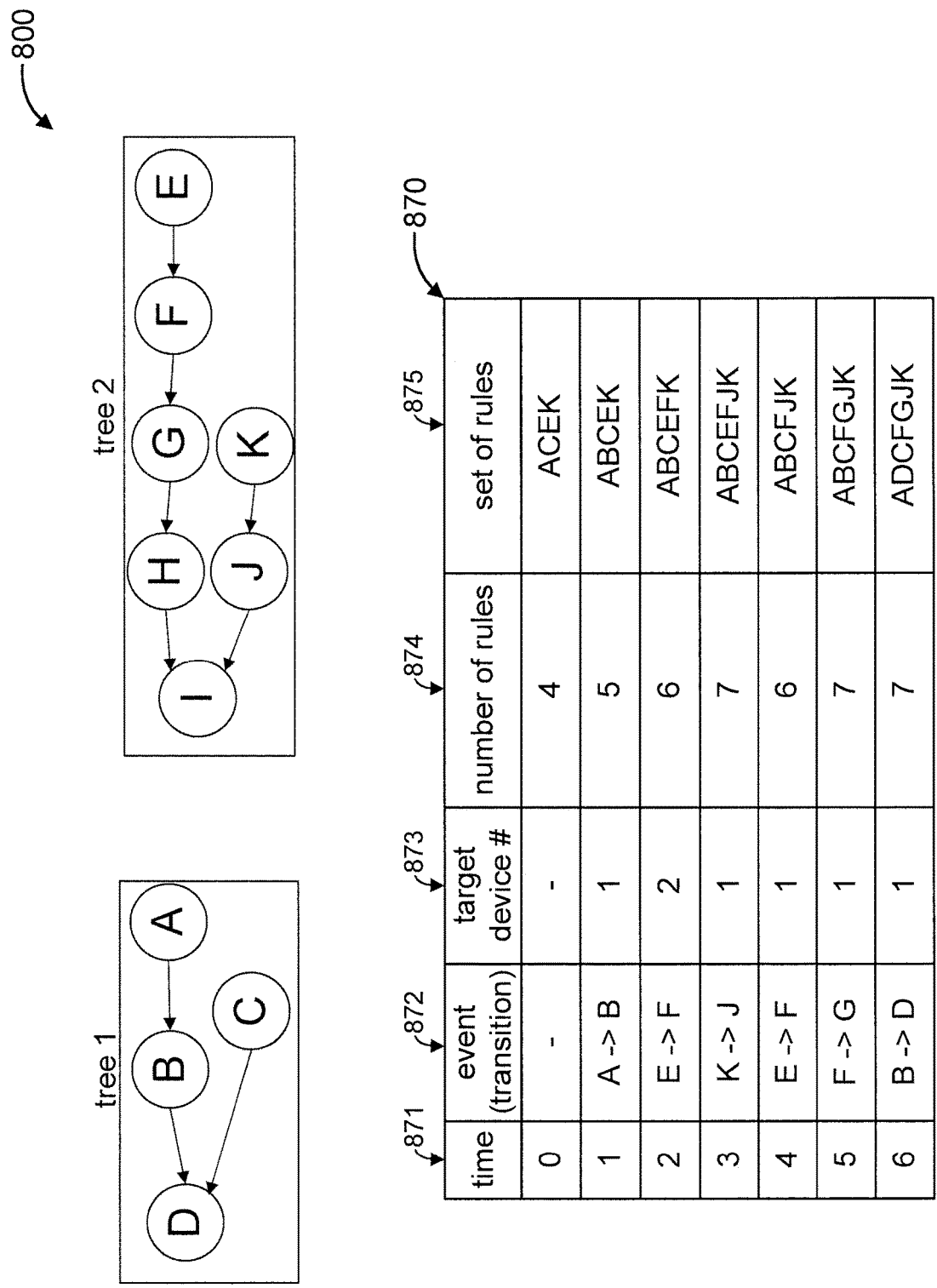
FIG. 8 shows an exemplary watchpoint transition, in accordance with an embodiment of the present invention.

FIG. 8 shows an exemplary watchpoint transition 800, in accordance with an embodiment of the present invention.

The watchpoint transition 800 involves target device 1 and target device 2, and further involves attack tree 1 and attack tree 2. Attack tree 1 involves events A through D, with event D corresponding to attack success. Attack tree 2 involves events E through K, with event I corresponding to attack success.

Table 870 shows various aspects of the watchpoint transition 800. To that end, table 870 includes a time column 871, an event (transition) column 872, a target device # column 873, a number of rules column 874, and a set of rules column 875.

For example, when time is 1, event B happens at target device 1. As a result, watchpoint for target device 1 on tree 1 moves from A to B, thus rule B will be loaded onto memory.

When each device is equally attacked, the number of rules increases.

However, concrete attacks (e.g., MIRAI malware) indicate that an attack to IoT devices goes to one or some small number of devices in a subnetwork because such a malware randomly attacks hosts in the Internet. Table 1 shows such a situation, and in the example of FIG. 8, four out of eleven rules can be eliminated from memory. That is, at time 6, rules B, E, H and I can be eliminated from memory.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
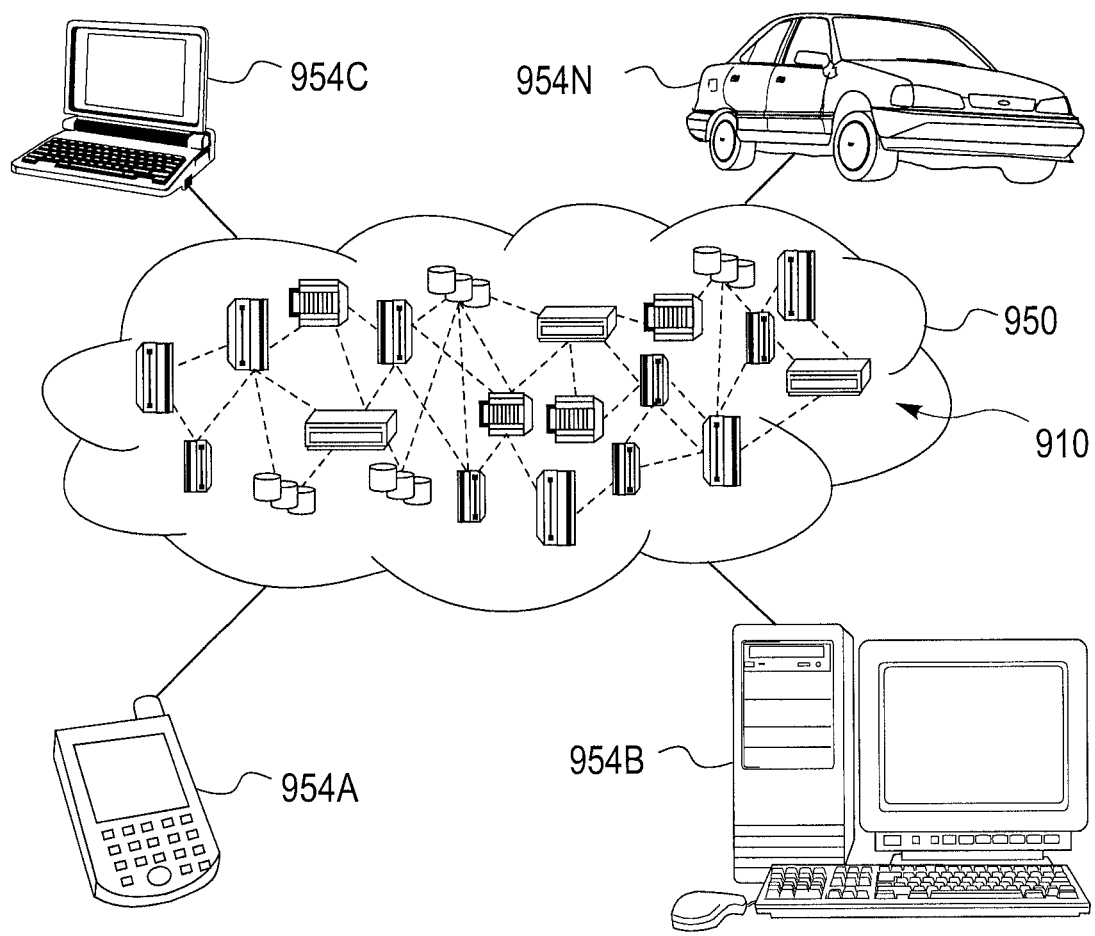
FIG. 9 shows a cloud computing environment, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
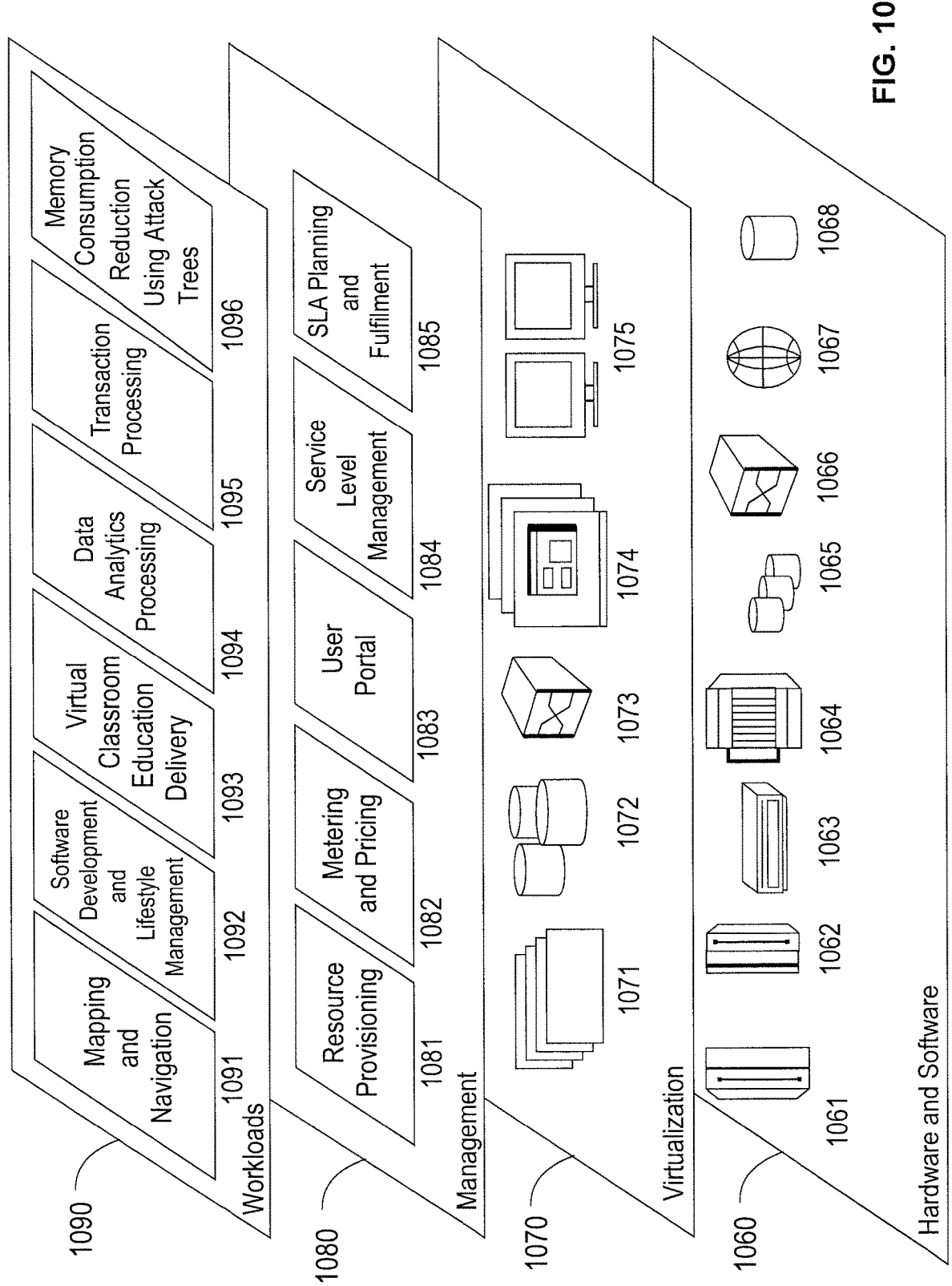
FIG. 10 shows abstraction model layers, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA. Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and memory consumption reduction by rule engines using attack trees 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for reducing memory consumption by a rule engine in an Internet of Things (IoT) device, the method comprising:
receiving a set of attack trees, each of the attack trees having a root, nodes and edges, each of the nodes other than the root node representing a respective security event and associated with a respective detection rule for detecting an occurrence of the respective security event, and each of the edges connecting a respective pair of the nodes;
assigning a respective watchpoint to each of leaf nodes from among the nodes in the attack trees;
moving the respective watchpoint assigned to any given one of the leaf nodes to a next upstream node towards the root node, loading into a memory of the IoT device only a subset of detection rules associated with a subset of the leaf nodes to which the respective watchpoint has been assigned forming one path from among multiple paths to coincide with a subnetwork attack of less than all possibly involved ones of the leaf nodes and excluding at least a detection rule and corresponding path portion for a transition source leaf node, and removing from the memory remaining ones of the detection rules forming remaining ones of the multiple paths that can no longer be taken to reduce the memory consumption, responsive to detecting an occurrence of the respective security event represented by the given one of the leaf nodes; and
erasing the respective watchpoint assigned to all downstream nodes relative to the next upstream node, responsive to the next upstream node being connected to a next one of the downstream nodes using an edge having an "OR" join type.

2. The computer-implemented method of claim 1, wherein the rule engine is an Event Condition Action rule engine.

3. The computer-implemented method of claim 1, wherein each of the edges have a type selected from the group consisting of a simple order, an AND join, and the OR join type.

4. The computer-implemented method of claim 1, wherein said assigning step assigns the respective watchpoint to each of the leaf nodes at an initial time of the runtime.

5. The computer-implemented method of claim 1, wherein the set of attack trees correspond to multiple devices under attack, and the method further comprises further associating each of the watchpoints with a particular one of the multiple devices.

6. The computer-implemented method of claim 5, wherein the watchpoints for each of the multiple devices can only be moved to nodes representing the respective security event involving a same one of the multiple devices.

7. The computer-implemented method of claim 1, wherein at least one of the attack trees in the set relates to information leakage via a server vulnerability.

8. The computer-implemented method of claim 1, wherein at least one of the attack tree in the set relates to making a computing device a bot.

9. The computer-implemented method of claim 1, wherein at least one attack implicated by the set of attack trees involves communication between a computing device and a cloud application.

10. A computer program product for reducing memory consumption by a rule engine in an Internet of Things (IoT) device, the computer program product comprising a non-transitory computer readable storage medium having program instructions embodied therewith, the program instructions executable by a computer to cause the computer to perform a method comprising:
receiving a set of attack trees, each of the attack trees having a root, nodes and edges, each of the nodes other than the root node representing a respective security event and associated with a respective detection rule for detecting an occurrence of the respective security event, and each of the edges connecting a respective pair of the nodes;
assigning a respective watchpoint to each of leaf nodes from among the nodes in the attack trees;

moving the respective watchpoint assigned to any given one of the leaf nodes to a next upstream node towards the root node, loading into a memory of the IoT device only a subset of detection rules associated with a subset of the leaf nodes to which the respective watchpoint has been assigned forming one path from among multiple paths to coincide with a subnetwork attack of less than all possibly involved ones of the leaf nodes and excluding at least a detection rule and corresponding path portion for a transition source leaf node, and removing from the memory remaining ones of the detection rules forming remaining ones of the multiple paths that can no longer be taken to reduce the memory consumption, responsive to detecting an occurrence of the respective security event represented by the given one of the leaf nodes; and erasing the respective watchpoint assigned to all downstream nodes relative to the next upstream node, responsive to the next upstream node being connected to a next one of the downstream nodes using an edge having an "OR" join type.

11. The computer program product of claim 10, wherein the rule engine is an Event Condition Action rule engine.

12. The computer program product of claim 10, wherein each of the edges have a type selected from the group consisting of a simple order, an AND join, and the OR join type.

13. The computer program product of claim 10, wherein said assigning step assigns the respective watchpoint to each of the leaf nodes at an initial time of the runtime.

14. The computer program product of claim 10, wherein the set of attack trees correspond to multiple devices under attack, and the method further comprises further associating each of the watchpoints with a particular one of the multiple devices.

15. The computer program product claim 14, wherein the watchpoints for each of the multiple devices can only be moved to nodes representing the respective security event involving a same one of the multiple devices.

16. The computer program product of claim 10, wherein at least one of the attack trees in the set relates to information leakage via a server vulnerability.

17. The computer program product of claim 10, wherein at least one of the attack tree in the set relates to making a computing device a bot.

18. The computer program product of claim 10, wherein at least one attack implicated by the set of attack trees involves communication between an Internet of Things device and a cloud application.

19. A computer processing system for reducing memory consumption by a rule engine in an Internet of Things (IoT) device, comprising:
a memory device
a processor operatively coupled to the memory device and configured to
receive a set of attack trees, each of the attack trees having a root, nodes and edges, each of the nodes other than the root node representing a respective security event and associated with a respective detection rule for detecting an occurrence of the respective security event, and each of the edges connecting a respective pair of the nodes;
assign a respective watchpoint to each of leaf nodes from among the nodes in the attack trees;
move the respective watchpoint assigned to any given one of the leaf nodes to a next upstream node towards the root node, load into a memory of the IoT device only a subset of detection rules associated with a subset of the leaf nodes to which the respective watchpoint has been assigned forming one path from among multiple paths to coincide with a subnetwork attack of less than all possibly involved ones of the leaf nodes and exclude at least a detection rule and corresponding path portion for a transition source leaf node, and remove from the memory remaining ones of the detection rules forming remaining ones of the multiple paths that can no longer be taken to reduce the memory consumption, responsive to detecting an occurrence of the respective security event represented by the given one of the leaf nodes; and
erase the respective watchpoint assigned to all downstream nodes relative to the next upstream node, responsive to the next upstream node being connected to a next one of the downstream nodes using an edge having an "OR" join type.

20. The computer processing system of claim 19, wherein said assigning step assigns the respective watchpoint to each of the leaf nodes at an initial time of the runtime.

* * * * *